US008300819B2

(12) United States Patent
Sakaguchi et al.

(10) Patent No.: US 8,300,819 B2
(45) Date of Patent: Oct. 30, 2012

(54) SERVICE PROVIDING APPARATUS AND SERVER PROVIDING METHOD

(75) Inventors: Haruhiko Sakaguchi, Kanagawa (JP); Tomihiko Nakajima, Tokyo (JP); Yoshifumi Ueno, Kanagawa (JP); Tetsuo Sasaki, Kanagawa (JP); Osamu Aoki, Tokyo (JP); Akinori Iida, Kanagawa (JP); Masayuki Kobuna, Kanagawa (JP); Shinichiro Taya, Kanagawa (JP); Kazuhiro Gotoh, Kanagawa (JP); Toshiyuki Gotoh, legal representative, Kanagawa (JP); Motohiro Ohama, Kanagawa (JP)

(73) Assignee: Sony Corporation, Tokyo (JP)

( * ) Notice: Subject to any disclaimer, the term of this patent is extended or adjusted under 35 U.S.C. 154(b) by 491 days.

(21) Appl. No.: 10/374,680

(22) Filed: Feb. 25, 2003

(65) Prior Publication Data

US 2004/0010685 A1 Jan. 15, 2004

(30) Foreign Application Priority Data

Feb. 25, 2002 (JP) .................................. 2002-048032

(51) Int. Cl.
*H04N 7/167* (2011.01)
(52) U.S. Cl. ........................................ 380/232; 705/52
(58) Field of Classification Search ................ 713/168, 713/182, 193; 726/26–33; 380/200–202, 380/229, 232, 230, 231, 233; 705/50–52, 705/56–59; 709/201–203, 229, 220, 221, 709/223–225; 707/9, 10, 1
See application file for complete search history.

(56) References Cited

U.S. PATENT DOCUMENTS

| | | | |
|---|---|---|---|
| 5,113,518 A | 5/1992 | Durst, Jr. et al. | |
| 6,065,120 A * | 5/2000 | Laursen et al. | 726/5 |
| 6,134,659 A * | 10/2000 | Sprong et al. | 713/190 |
| 6,151,643 A * | 11/2000 | Cheng et al. | 710/36 |
| 6,189,146 B1 * | 2/2001 | Misra et al. | 717/177 |
| 6,205,445 B1 * | 3/2001 | Tokuyama | 1/1 |
| 6,233,567 B1 * | 5/2001 | Cohen | 705/59 |
| 6,243,468 B1 * | 6/2001 | Pearce et al. | 380/255 |
| 6,460,140 B1 * | 10/2002 | Schoch et al. | 726/22 |
| 6,571,290 B2 * | 5/2003 | Selgas et al. | 709/228 |
| 6,681,212 B1 * | 1/2004 | Zeng | 705/51 |
| 6,732,106 B2 * | 5/2004 | Okamoto et al. | 707/100 |
| 6,981,150 B2 * | 12/2005 | Little et al. | 713/191 |
| 7,055,149 B2 * | 5/2006 | Birkholz et al. | 717/172 |
| 7,167,841 B2 * | 1/2007 | Hatano et al. | 705/56 |
| 2001/0011253 A1 * | 8/2001 | Coley et al. | 705/59 |
| 2001/0044782 A1 * | 11/2001 | Hughes et al. | 705/59 |
| 2001/0052077 A1 | 12/2001 | Fung et al. | |
| 2002/0010681 A1 * | 1/2002 | Hillegass et al. | 705/59 |
| 2002/0029336 A1 * | 3/2002 | Sekiyama et al. | 713/169 |
| 2002/0091652 A1 * | 7/2002 | Nagahara | 705/400 |
| 2002/0128842 A1 * | 9/2002 | Hoi et al. | 704/260 |
| 2002/0129235 A1 * | 9/2002 | Okamoto et al. | 713/150 |
| 2002/0143893 A1 * | 10/2002 | Nakazono et al. | 709/217 |
| 2002/0152400 A1 * | 10/2002 | Zhang et al. | 713/201 |
| 2002/0168962 A1 * | 11/2002 | Kurakake et al. | 455/411 |

FOREIGN PATENT DOCUMENTS

GB 2343531 A 5/2000
(Continued)

*Primary Examiner* — Nirav B. Patel
(74) *Attorney, Agent, or Firm* — Wolf, Greenfield & Sacks, P.C.

(57) ABSTRACT

In service providing apparatus and method, system identification data for specifying a service target device and the user of the device concerned are issued to the device concerned, and authentication processing is carried out on the basis of the system identification data to provide a service to the device concerned.

9 Claims, 5 Drawing Sheets

FOREIGN PATENT DOCUMENTS

| | | |
|---|---|---|
| GB | 2365175 A | 2/2002 |
| WO | WO00/35143 | 6/2000 |
| WO | WO00/75760 A1 | 12/2000 |
| WO | WO03/100629 A1 | 12/2003 |
| WO | WO2004/001589 A2 | 12/2003 |

* cited by examiner

SERVICE PROVIDING APPARATUS AND SERVER PROVIDING METHOD

BACKGROUND OF THE INVENTION

1. Field of the Invention

The present invention relates to a service providing apparatus and a service providing method, and it is applicable to a service for downloading application programs, for example. According to the present invention, system identification data for specifying a service target device and the user of the device are issued to the device concerned, and authentication processing is carried out on the basis of the system identification data to provide services, whereby a cumbersome work at the user side can be effectively avoided and user's desired service and optimum service can be provided through the Internet or the like.

2. Description of the Related Art

Various kinds of application programs for personal use for use in personal computers have been hitherto provided integrally with the computers while being installed in the computers or provided separately from the computers while recorded in recording media such as CD-ROMs.

On the other hand, services of providing these kinds of application programs through download using the Internet have been recently developed. In this case, at the user side, users access home pages managed by, for example, software firms to download their desired application programs.

With respect to the provision of services through the Internet as described above, various methods have been proposed as disclosed in JP-A-11-6203, etc., for example, and these methods are used for not only provision of application programs, but also sale of goods, etc.

In the case of application programs which are provided integrally with a computer, there may occur a case where they contain some application programs which are not necessarily needed by a user, however, such unnecessary application programs can be excluded in the case of application programs which are provided separately from a computer. Particularly in the case of application programs which are provided by using the Internet, the connection to the Internet is established and necessary application programs can be downloaded at that time, so that the user's convenience, etc. can be more enhanced as compared with the case where application programs are separately provided by using CD-ROM or the like.

With respect to application programs, there is such a case where one person uses one application program for plural devices. As a result, when application programs are provided by using the Internet, it is necessary to specify the user and further specify the user's device. Accordingly, it is required for the user side to manage data for specifying the user and further specifying the device, and the management of the data is remarkably cumbersome. When one person uses plural devices, it is necessary to manage the data for specifying the individual separately from the management of the data for specifying each device in connection with each device. On the other hand, when one person uses one device, it is necessary to manage two kinds of identification data for one device.

SUMMARY OF THE INVENTION

The present invention has been implemented in view of the foregoing situation, and has an object to provide a service providing apparatus and a service providing method which can effectively avoid a cumbersome work at the user side and provide a user's desired service and an optimum service through the Internet or the like.

In order to attain the above object, according to a first aspect of the present invention, there is provided a service providing apparatus for providing a service, which comprises: identification data issuing means for issuing, to a service target device, system identification data for specifying the service target device and the user of the device concerned through data communications with the service target device; and service providing means for authenticating the device concerned and the user of the device concerned on the basis of the system identification data in response to a service request from the device concerned and providing a service to the device concerned.

According to a second aspect of the present invention, there is provided a service providing method for providing a service, which comprises: an identification data issuing step for issuing, to a service target device, system identification data for specifying the service target device and the user of the device concerned through data communications with the service target device; and a service providing step for authenticating the device concerned and the user of the device concerned on the basis of the system identification data in response to a service request from the device concerned and providing a service to the device concerned.

According to a third aspect of the present invention, there is provided a service providing apparatus for providing a service, which comprises: system identification data issuing means for issuing, to a device communicating through a network, system identification data for identifying the device concerned and the user of the device concerned; authenticating means for authenticating the device concerned and the user of the device concerned on the basis of the system identification data in response to a service request from the device concerned; and service providing means for providing a service to the device concerned when the device concerned and the user of the device concerned are authenticated in the authenticating means.

According to a fourth aspect of the present invention, there is provided a service providing apparatus for providing a service, which comprises: system identification data issuing means for issuing, to a device communicating through a network, system identification data for identifying the device concerned and the user of the device concerned; authenticating means for authenticating the device concerned and the user of the device concerned on the basis of the system identification data in response to a download service request from the device concerned; and download service providing means for providing a download service to be provided to the device concerned on the basis of system data indicating the system structure of the device concerned when the device concerned and the user of the device concerned are authenticated in the authenticating means.

According to the present invention, the user and the device are authenticated on the basis of the system identification data issued by the identification data issuing means, and the service is provided to the device concerned on the basis of the authentication. For example, when the service is a service of providing a program by download, the user at the device side can select a program for the device and download the program as occasion demands by the management of the system identification data of each device without executing any work of checking the device and selecting a downloadable program every time and further any processing for user authentication. Accordingly, the cumbersome work at the user side can be effectively avoided, and a user's desired service and an optimum service can be provided through the Internet or the like.

DETAILED DESCRIPTION OF THE PREFERRED EMBODIMENT

A preferred embodiment according to the present invention will be described hereunder with reference to the accompanying drawings.

(1) Construction of Embodiment

Figure 2:
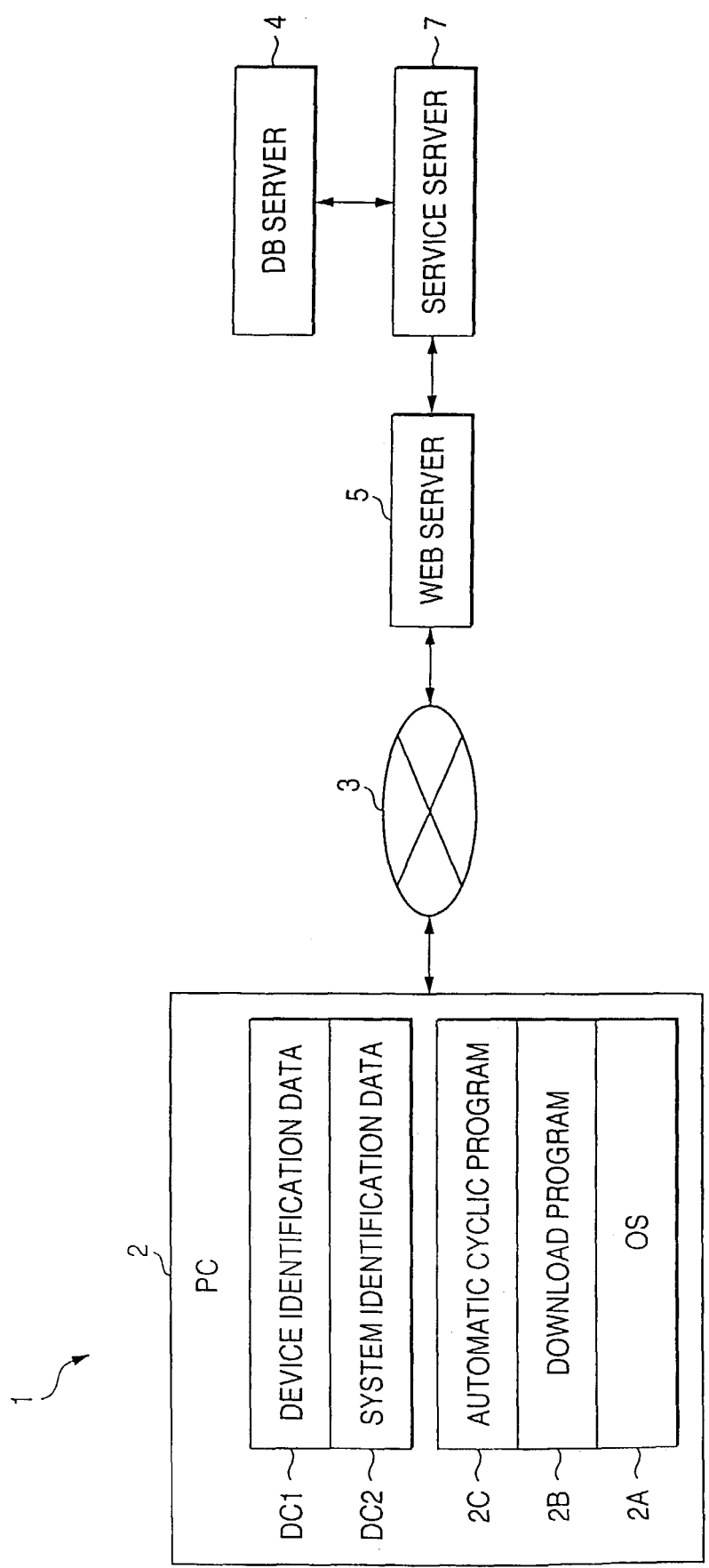
FIG. 2 is a block diagram showing the program providing system according to the embodiment of the present invention.

FIG. 2 is a block diagram showing a program providing system according to an embodiment of the present invention. A program providing system 1 provides various kinds of application programs, etc. through the Internet 3 to a personal computer (PC) 2 which a user owns. In this service, the program providing system 1 is usable by making user registration in advance, and in response to a service request from a user-registered personal computer 2, the program providing system 1 allows the personal computer concerned to download desired application programs or the like in various using styles. In the program providing system 1, the exchange of device identification data, etc. between the computer 2 and a web server 5 is performed while encrypting the data, etc., whereby these data can be prevented from being unjustly achieved by a third party.

Here, the personal computer 2 is a computer operated by each of various kinds of operating systems (OS) 2A, and it is sold by a sales system using the same Internet 3. The personal computer 2 is designed to be connected to the Internet 3. The personal computer 2 is also designed so that data necessary for the settlement (hereinafter referred to as "settlement data") of a user who purchased the personal computer 2 at the time of the sales using the Internet 3 is achieved and this settlement data is recorded in a data base server (DB server) 4 together with device identification data DC1 inherent to the computer 2 and a log-in ID and a password in the program providing system 1, etc. in advance.

Here, the device identification data DC1 inherent to the computer 2 is identification data with which the computer 2 can be specified, and it comprises a serial number of the computer 2, for example. The device identification data DC1 is recorded in specific recording means of the personal computer 2 so that it cannot be changed by the user. The settlement data is needed to withdraw the amount of charged money from user's account such as a user's account number. The password and the log-in ID are authentication data needed for user registration, and are identification data inherent to the user with which the user can be specified.

The computer 2 is provided while predetermined application programs such as an operation system 2A, and a web browser are pre-installed, and also a password and a log-in ID in the data base server 4 are supplied to a user separately from the above application programs. Furthermore, the computer 2 is designed so as to display a short-cut icon for easily downloading a support program necessary for user registration on an initial display screen together with other icons on start-up of a power source of the computer 2. As a result, in the personal computer 2, the user registration is carried out by operating the icon and the support program can be easily downloaded.

Here, the support program comprises a download program 2B, an automatic cyclic program 2C, etc. The download program 2B is a program for managing the user registration of the program providing system 1 and download, update, etc. of various kinds of application programs provided by the program providing system 1, and it comprises a browser, plug-in software of the browser, etc. As described later, the download program 2B transmits system data, device identification data DC1 and system identification data DC2 to the web server (5) side through these processing. The transmission of various data is performed on the basis of user's acknowledgment.

Here, the system data indicates the construction of the computer 2, and it comprises the hardware data of the computer 2 and the software data of the computer 2. The hardware data of the computer 2 indicates the construction of various kinds of hardware of the computer 2, and comprises, for example, data for specifying the model number of a processor. The software data of the computer 2 indicates the construction of the software implemented in the computer 2. It comprises data for specifying the operation system, the application programs, drivers, etc., and contains the data of the versions, editions and patches of these data, the date and hour at which the data are installed into the computer 2, the name of the maker, etc. Accordingly, when a user downloads application programs or the like, the data of various application programs or the like installed in the computer 2 can be checked on the basis of the system data at the web server (5) side.

The system identification data DC2 is an identification code for specifying the user of the personal computer 2 and the personal computer 2 itself. The system identification data DC2 is issued by a service server 7 so that it can be identified by not only the same type of computers 2, but also different types of computers, equipment other than the computers, for example, various kinds of data equipment such as cellular phones, PDA (Personal Digital Assistant), various kinds of video equipment such as set top boxes, game machines, and various kinds of audio equipment. The system identification data DC2 is recorded in specific recording means of the personal computer 2 so that the user cannot easily detect these data.

The automatic cyclic program 2C periodically circulates among home pages provided by the web server 5 to achieve various kinds of information, and provides users with the information achieved in connection with these information. Accordingly, in this embodiment, when a new application program or the like is prepared in the service server 7 so that it can be downloaded, and furthermore when a version-up program is prepared in the service server 7 so that it can be newly updated, this is notified to the user. Accordingly, the latest-version programs, etc. can be implemented in the computers 2 at all times by executing the download, update processing as described later on the basis of this notification even when the user side does not know the update or the like.

The detailed constructions of the download program and the automatic cyclic program will be described together with the description on the constructions of the web server 5 and the service server 7 as described later.

Figure 3:
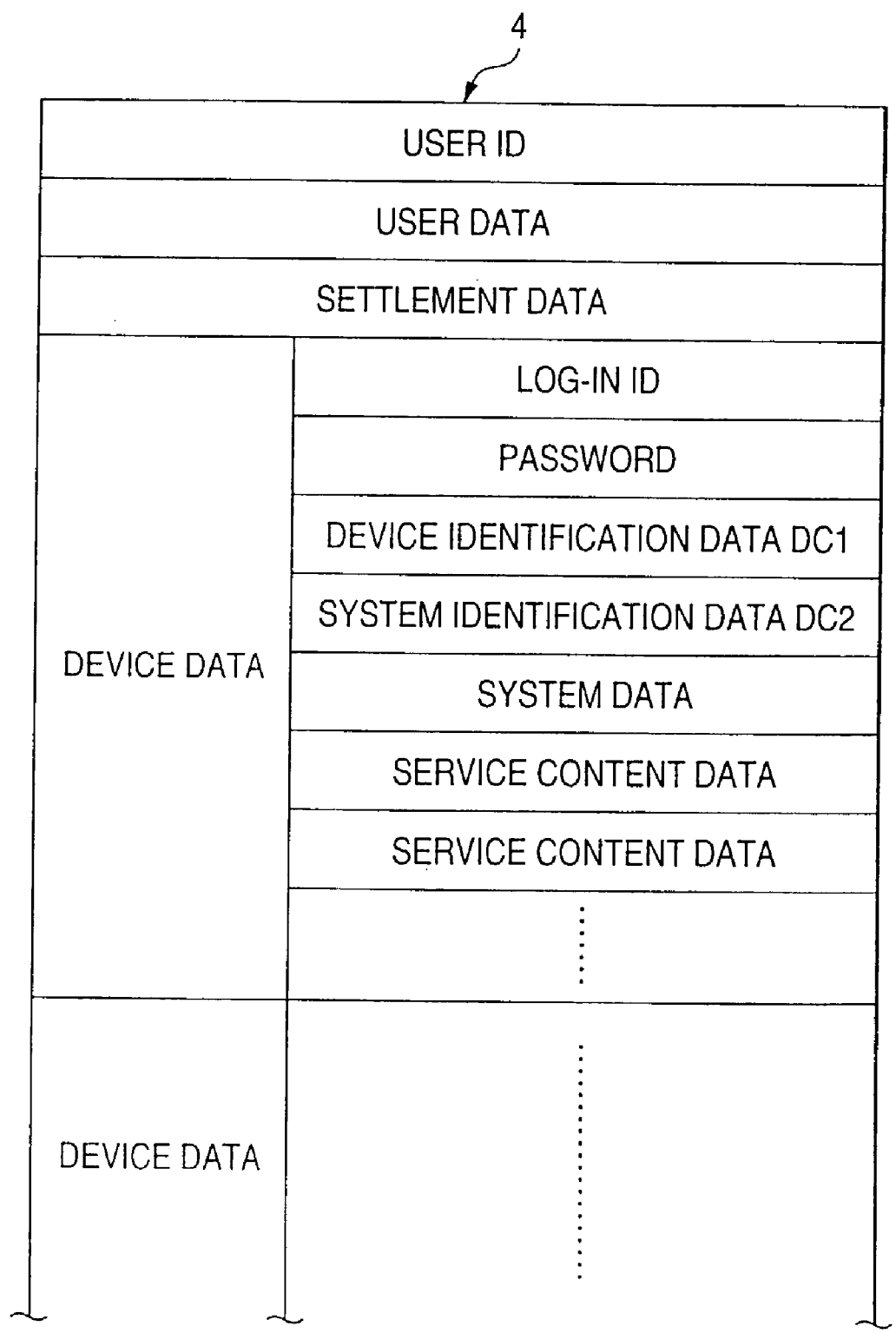
FIG. 3 is a table showing the data base structure in the program providing system of FIG. 1.

The data base server 4 records the device identification data DC1 inherent to the computer 2 as described aforementioned, the settlement data, the password, the log-in ID, the system identification data DC2, the system data, etc., every user to construct a data base. Here, FIG. 3 is a schematic diagram showing the contents of the data base constructed by the data base server 4. The data base is created for the user owning the computer 2, and data achieved from the data base in connection with purchase of the personal computer 2 and further data achieved from the personal computer 2 through the processing of user registration or the like are recorded in the data base.

The data base is constructed every user by a user ID set for each user, user data on the address, name, telephone number and age of the user concerned, the registration date (year, month, day) of user registration, etc., settlement data, device data of each device, etc.

Here, the device data is constructed by the data of each device owned by the user. In this embodiment, the device data contains various data on the personal computer 2, and the login ID and the password which are allocated to the personal computer 2 and correspond to identification codes inherent to the user are contained in the device data. The device identification data DC1 and the system identification data DC2 are allocated in the device data, and system data which were past notified at plural times from the personal computer 2 are contained in the device data. The device data further contains service content data indicating the contents of services with respect to each application program downloaded into the computer 2 in the program providing system 1.

The service content data contains a code for specifying an application program downloaded by the user, a code for indicating whether the download of the application program concerned is purchased by the user or associated with a specific service, data on an expiration date, etc. Here, the specific service is a service for providing users with application programs at charge or at no charge by monthly charging or as a so-called term-limited trial. The service content data is recorded every application program downloaded in the personal computer 2.

The web server 5 is a server for opening home pages for users in the program providing system 1, and the service server 7 processes various kinds of information achieved from the personal computer 2 through the web server 5 to execute a series of processing associated with the program providing system in cooperation with the web server 5. The service server 7 is designed to construct data bases of application programs, drivers, patches, etc. provided in the program providing system 1.

Figure 4:
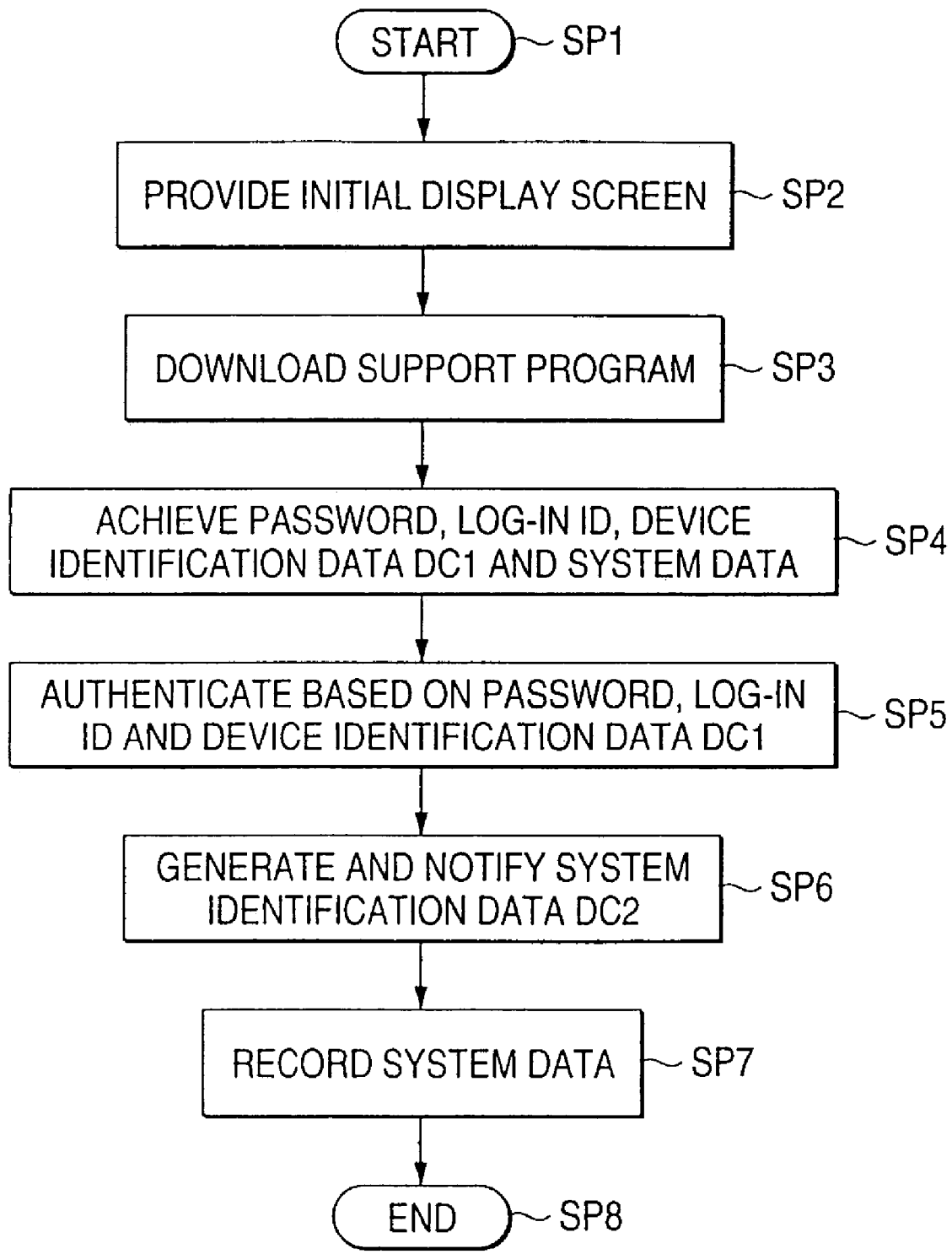
FIG. 4 is a flowchart showing the processing flow at the user registration time in the program providing system of FIG. 1.

That is, FIG. 4 is a flowchart showing the procedure of a series of processing associated with the user registration. When a short-cut for user registration in the computer 2 is operated by the user to make an access of the computer 2 through URL set on the short-cut, the web server 5 goes from step SP1 to step SP2 to display a display screen for requesting the description on the user registration method, etc. and user's agreement.

Here, in order to receive the services from the program providing system 1, it is necessary to download the support program in advance, and thus a message indicating necessity of the registration processing using the support program is displayed on the display screen for user registration together with a series of working procedures, the functions of the support program, the service contents implemented by the support program, a download menu for the support program, etc., and a message for requesting user's agreement thereto. When the user agrees with the display content, the download menu for the support program is selected by the user in the personal computer 2. Furthermore, when an access is executed while tracing a link set on the menu, the web server 5 goes from step SP2 to SP3 to notify download of the support program to the service server 7. On the basis of this notification, the service server 7 transmits the support program through the web server 5 to the personal computer 2, whereby the support program can be achieved in the personal computer 2.

Here, after downloaded thus, the support program is started and implemented into the personal computer. Furthermore, when the user starts the support program, a series of initial processing for user registration is executed. The support program is designed to display an input display screen for the password and the log-in ID on a display screen of the personal computer 2 though the initial processing. When the password and the log-in ID are input and the user operates a transmission menu, the support program transmits the password and the log-in ID to the web server 5. At the same time, the device identification data DC1 and the system data are achieved by the automatic cyclic program in the support program, and transmitted to the web server 5.

Whereby the service server 7 achieves the password, the log-in ID, the device identification data DC1 and the system data through the web server 5 in the step SP4. Furthermore, the processing for authentication is executed in the subsequent step SP5 by accessing the data base server 4 on the basis of the password, the log-in ID, the device identification data DC1 and the system data.

Here, in the authentication processing, with respect to the user specified on the basis of the log-in ID and the password, it is checked whether the device identification data DC1 of the corresponding device data recorded in the data base and the device identification data DC1 achieved by the personal computer 2 are coincident with each other. With respect to the device data for which the device identification data DC1 is coincident, it is checked whether the system identification data DC2 has not yet been issued and thus the user registration has not yet been performed. Furthermore, with respect to the system data of the device data specified thus, it is checked from the comparison with the system data recorded at the selling time whether the personal computer 2 associated with the access is the device associated with the password, the login ID and the device identification data DC1.

When at least one of the above checks is negative through the authentication processing described above, in the service server 7, in the processing associated with this user registration, it is judged that an access or the like is made by a user who unjustly achieves the log-in ID, the password or the like. Therefore, failure of the authentication processing is notified to the web server 5. Accordingly, the web server 5 provides the personal computer 2 with a display screen indicating that it is difficult to perform the user registration, and then finishes this processing.

On the other hand, when all the checks are rightly performed through the authentication processing, the user associated with the access is a normal user, and the personal computer 2 is a normally shipped product. Therefore, in the service server 7, in the subsequent step SP6 the system identification data DC2 is created, and the system identification data DC2 is recorded in the corresponding area of the data base by the data base server 4. Furthermore, the system identification data DC2 is notified to the download program 2B of the personal computer 2. The download program 2B records and holds the system identification data DC2 behind the curtain in such a manner as to make it difficult to alter the system identification data DC2 dishonestly. The service server 7 creates the system identification data DC2 by predetermined mathematical processing so that the system identification data DC2 is irrelevant to the user registration, the services and the other information and it is impossible to analogize the system thereof.

In the subsequent step SP7, the web server 5 and the service server 7 records the system data achieved in step SP4 in the data base of the data base server 4, and in the subsequent step SP8 they finishes the processing procedure.

The web server 5 and the service server 7 authenticate the user and the personal computer 2 by using the system identification data DC2 distributed to the user as described above, and further ascertain the authentication of the user and the personal computer 2 by using the system data and the device identification data DC1 in combination.

Figure 1:
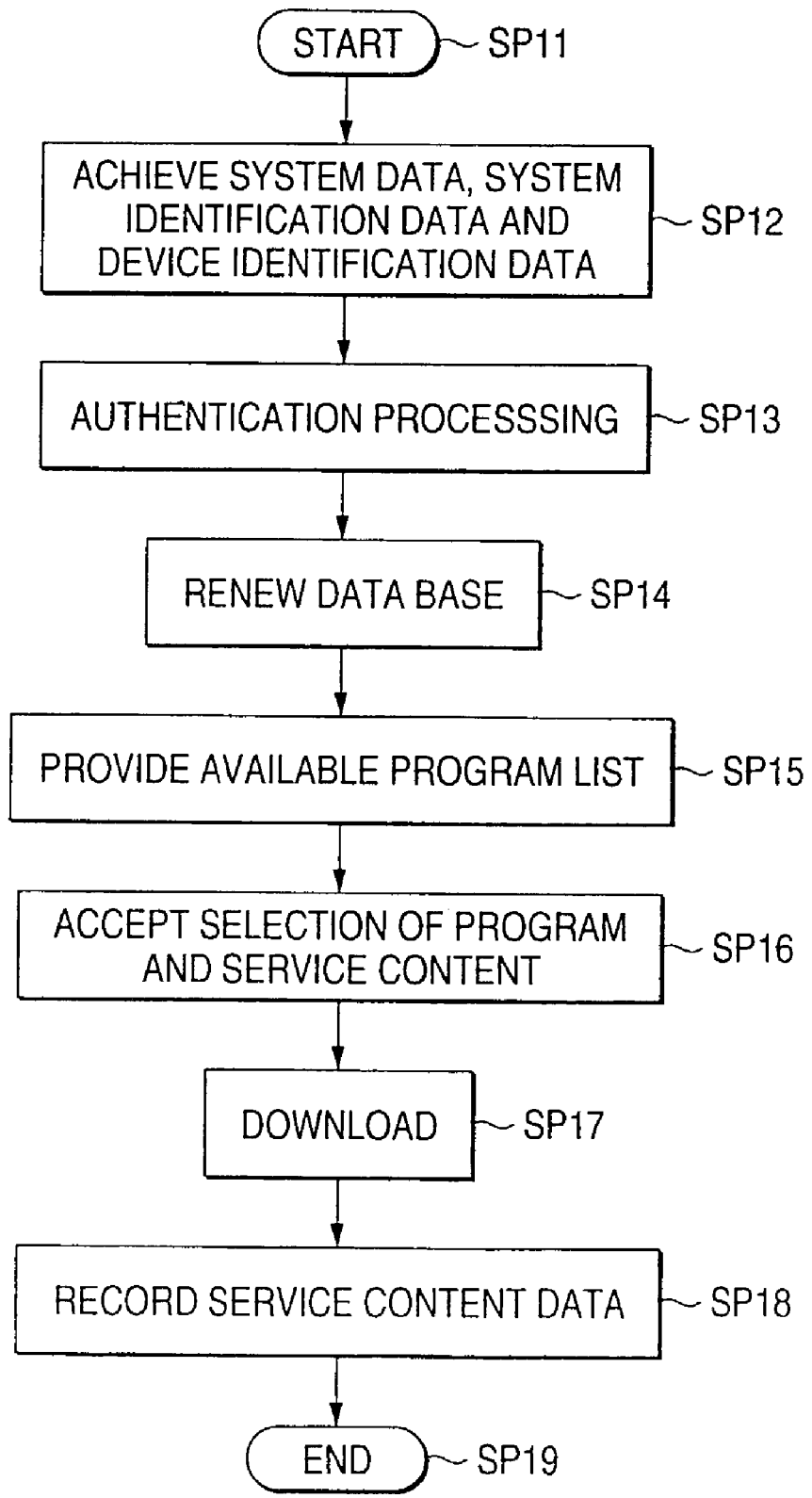
FIG. 1 is a flowchart showing the processing flow at the download time in a program providing system according to an embodiment of the present invention.

That is, FIG. 1 is a flowchart showing the procedure of a series of processing associated with the download. In the program providing system 1, when the download program is started and the menu for the download is selected in the personal computer 2 by the user, this processing procedure is executed. Here, the download program creates the system data by the selection of this menu, and transmits the system data to the web server 5 together with the system identification data DC2 and the device identification data DC1.

Accordingly, the web server 5 and the service server 7 go from step SP11 to step SP12 to achieve the system data, the system identification data DC2 and the device identification data DC1. In the subsequent step SP13, the user and the personal computer 2 are authenticated by accessing the data base of the data base server 4 on the basis of the system data, the system identification data DC2 and the device identification data DC1.

Here, the service server 7 accesses the data base on the basis of the system identification data DC2 achieved in step SP12 to check whether the corresponding system identification data DC2 exists, thereby authenticating the personal computer 2 and the user of the personal computer 2. Furthermore, in addition to the authentication based on the system identification data DC2, it is checked whether the device identification data DC1 recorded in the data base which is specified on the basis of the system identification data DC2 achieved in step SP12 is coincident with the device identification data DC1 achieved in step SP12. Furthermore, the personal computer 2 is authenticated by comparing the system data achieved in step SP12 with the system data recorded in the data base specified by the system identification data DC2 achieved in step SP12. In the authentication based on the comparison of the system data, there may be considered a case where the user separately installs an application program or the like, and thus the coincidence in the basic hardware construction and the software construction is checked.

When no coincidence result is achieved through the check processing for the authentication, there may be considered a case where a third party who pretends to be a normal user is making an access. Alternatively, there may be considered a case where a normal user is making an access, however, the user uses a computer different from a user-registered personal computer. In such a case, the service server 7 notifies failure of authentication to the web server 5, and on the basis of this notification, the web server 5 provides the personal computer 2 with a display screen indicating that this service is unusable.

On the other hand, when the authentication succeeds, in the subsequent step SP14, the service server 7 records the system data achieved in step SP12 in addition to the recording of the system data of the data base by the data base server 4, whereby the records of the hardware construction and the software construction in the personal computer 2 can be recorded.

Furthermore, the success of the authentication is notified to the web server 5, and on the basis of this notification, the web server 5 provides a display screen for a list of application programs, drivers, patches, etc. provided by the program providing system 1. Accordingly, in the program providing system 1, the user and the personal computer 2 are authenticated on the basis of the system identification data DC2 which is one kind of identification code without notifying the log-in ID, the password, etc. to the web server 5 by user's operation, and thus the management of the computer (2) side can be simplified.

By automatically executing the return of the system identification data DC2, the series of processing can be executed at the user side with paying no attention to this type of authentication processing, so that the management of the user side can be further simplified. Furthermore, by further authenticating the personal computer 2 on the basis of the device identification data DC1 for specifying the device and the system data in addition to the authentication based on one system identification data DC2 as described above, any third party can be surely prevented from unjustly achieving programs, and there can be surely provide a service suitable for the personal computer 2.

That is, when the title of each program or the like is selected on the list display screen by user's mouse operation, the web server 5 provides the personal computer 2 with a display screen for the detailed description of the content of each program or the like through an access tracing links set to the title. At this time, when the user selects a menu for the download box, the web server 5 provides the personal computer 2 with a list of titles of available programs, etc. through an access tracing links set in the menu.

Through the above processing, the web server 5 notifies the access in the menu for the download box to the service server 7, and on the basis of this notification, the service server 7 refers to the system data achieved in the step SP12 to select application programs, drivers, etc. usable in the personal computer 2. Furthermore, with respect to the applications, the drivers, etc. thus selected, programs which have been already installed in the personal computer 2 are properly displayed, so that the applications which have been already purchased or the programs which have been already installed can be easily identified at the user side.

On the basis of these notifications, a list of available programs, etc. is displayed at the personal computer 2. When the title of each program or the like is selected on the list display screen by the mouse operation, the web server 5 provides the personal computer 2 with a display screen for the detailed description of the content of each program or the like through an access tracing links set to the title. Furthermore, in the web server 5, a list of available services is displayed for application programs on this display screen.

When the user selects a desired service content on the list display screen of the services and operates a menu for checking this display screen, the web server 5 accepts selection of download of this program, selection of a service in the subsequent step SP16. When the application program selected by the user is a program associated with a driver or patch in the list of the step SP15, it is provided with free-charge in the program providing system 1. Therefore, the check of the download by the user is accepted in step SP16 without displaying a service list as described above.

The web server 5 notifies this selection to the service server 7, and on the basis of this notification, the service server 7 transmits the corresponding application program or the like through the web server 5 to the personal computer 2 in the subsequent step SP17. The service server 7 downloads the application program or the like selected by the user.

When the download is completed, the service server 7 records the name of the program thus downloaded, the content of a service if the program is associated with a special service, the download date, restriction of functions, etc. as service content data of the corresponding device data in step SP18.

When the content of the data base is renewed to the content associated with the download, the service server 7 further renews the content of the system data recorded in the data base 4 so that the content of the system data is matched with alteration of the software construction based on the download, and goes to step SP19 to finish the processing procedure.

Accordingly, in the program providing system 1, a user's desired program can be downloaded in a user's desired using style by easy operation.

Figure 5:
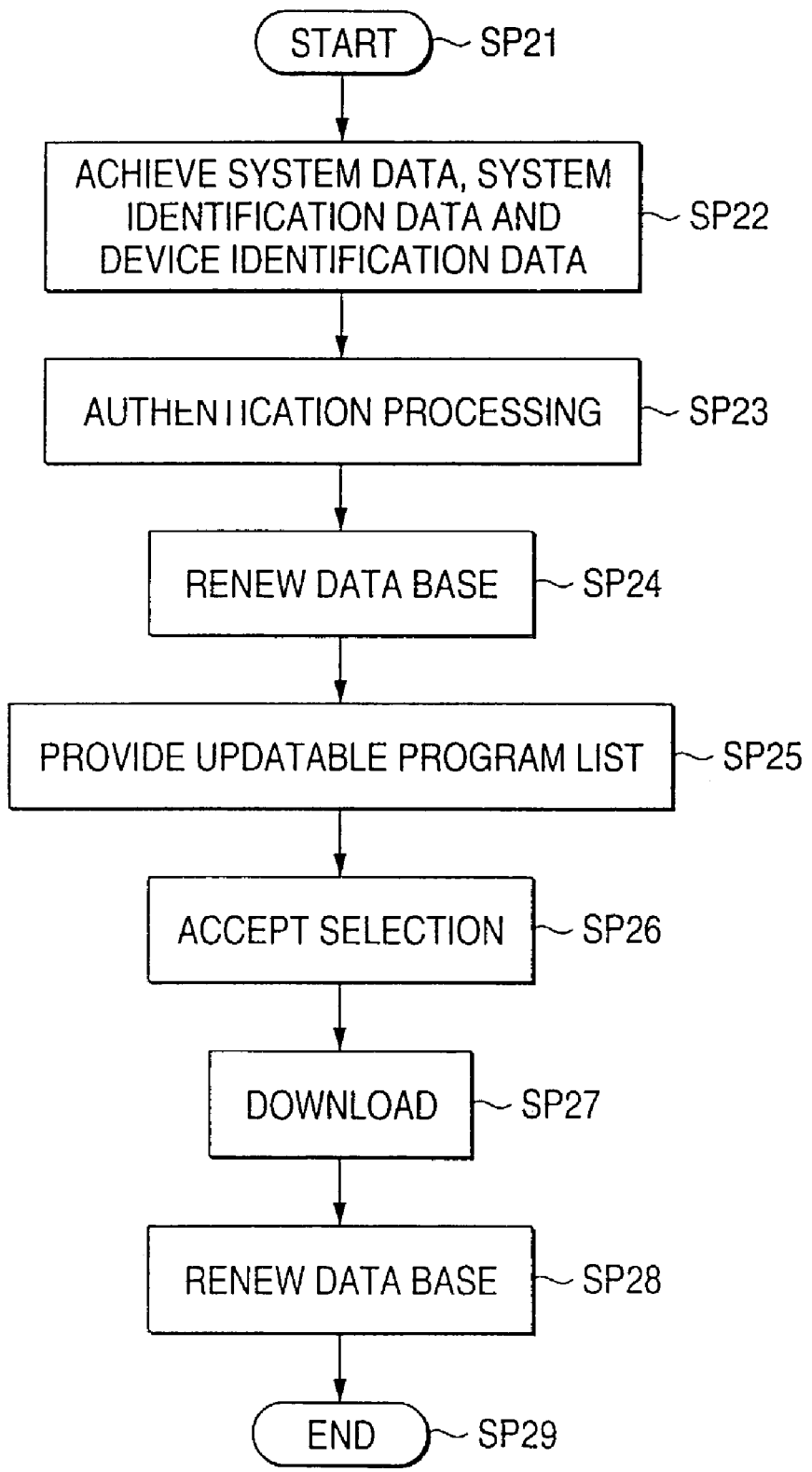
FIG. 5 is a flowchart showing the processing flow at the update time in the program providing system of FIG. 1.

FIG. 5 is a flowchart showing the procedure of the update processing of application programs, drivers, etc. thus downloaded.

In the program providing system 1, when the download program is started and an update menu is selected in the personal computer 2 by the user, this processing is executed. Here, by selection of the update menu, the download program transmits the system data to the web server 5 together with the system identification data DC2, the device identification data DC1 as in the case of the download.

At this time, the web server 5 and the service server 7 goes from step SP21 to SP22 to achieve the system data, the system identification data DC2 and the device identification data DC1. In the subsequent step SP23, the authentication processing is executed on the basis of the system data, the system identification data DC2 and the device identification data DC1 as in the case of the download.

When the authentication succeeds, the service server 7 additionally records the record of the system data of the data base by the data base server 4 in the subsequent step SP24, whereby the hardware construction and the record of the software construction in the personal computer 2 can be recorded.

Furthermore, the success of the authentication is notified to the web server 5, and on the basis of this notification, the web server 5 provides a display screen of a list of application programs, drivers, patches, etc. to be updated by the program providing system 1. Accordingly, in the program providing system 1, the user and the personal computer 2 can be authenticated without notifying the log-in ID, the password, etc. to the web server 5 by the user's operation each time, and a normal user (a personal computer 2 at the normal user side) can use this service.

When the title of each program or the like is selected on the list display screen by the user's mouse operation, the web server 5 provides the personal computer 2 with the display screen for the detailed description of the contents of version-up, edition-up, etc. through an access tracing links set to the title. When an update box menu is selected by the user, a list of the titles of updatable programs or the like is provided to the personal computer 2 through an access tracing links set in the menu.

Through this processing, the web server 5 notifies the access based on the menu of the download box to the service server 7, and on the basis of this notification, the service server 7 refers to the system data achieved in step SP22 to select applications, drivers, etc. associated with the update which can be used in the personal computer 2. Furthermore, programs which are contained in the applications, the drivers, etc. thus selected and have been already updated in the personal computer 2 are properly displayed, whereby the user can easily identify the applications which have been already purchased and the programs which have been already installed.

On the basis of these notifications, a list of the updatable programs, etc. is displayed in the personal computer 2. When the title of each program or the like is selected on the list display screen by the mouse operation, the web server 5 provides the personal computer 2 with a display screen for the detailed description of the contents associated with the version-up, edition-up of each update program through an access tracing links set to the title.

When a menu for checking upload is operated on this display screen by the user, the web server 5 accepts this program selection in the subsequent step SP26. The web server 5 notifies this selection to the service server 7, and on the basis of this notification, the service server 7 transmits the corresponding program to the personal computer 2 through the web server 5 in the subsequent step SP27, whereby the service server 7 downloads and updates the application program or the like selected by the user.

When the download is completed, the service server 7 renews the corresponding contents of the data base as in the case of the download in step SP28, and goes to step SP29 to finish the processing procedure, whereby a desired program can be updated by easy operation in the program providing system 1. At this time, in the personal computer 2, the update-associated program or the like thus downloaded can be updated by carrying out the install processing according to the processing procedure set for each program.

When the download/update processing is carried out with charge, the service server 7 and the web server 5 displays the service content, the version-up content, etc. together with the charge for use of each service. Furthermore, the settlement processing is executed in accordance with the service selected by the user.

That is, when a user downloads application programs by purchase or updates various kinds of programs, the service server 7 executes the settlement processing on the basis of settlement data recorded in the data base by the data base server 4 with respect to the corresponding charges.

Therefore, according to this embodiment, the service server 7 and the web server 5 constitute identification data issuing means by which system identification data for specifying a service target device (i.e., a personal computer 2) and the user of the device is issued to the service target device through the communications with the service target device, and also constitute service providing means for authenticating the device concerned and the user of the device concerned on the basis of the system identification data in response to a service request from the device concerned and providing services to the device concerned.

(2) Operation of Embodiment

In the program providing system 1 (FIG. 2), the short-cut to the user registration home page by the web server 5 and the device identification data DC1 for specifying the personal computer 2 are recorded in the personal computer 2, and thus they are provided to the user together with the identification data DC1 which is inherent to the personal computer 2 and specifies the personal computer 2, and the log-in ID and the password corresponding to the identification data which is inherent to the user and specifies the user. The system data indicating the hardware construction and the software construction of the personal computer at the shipping time and the log-in ID, the password and the device identification data DC1 provided to the user are recorded and held as the device data associated with the personal computer 2 in the data base based on the user ID for specifying the user, the user data such as the address, and the name, and the settlement data (FIG. 3)

In the program providing system 1, when the user registering operation is carried out by user's selection of the short-cut in the personal computer 2 provided thus (FIG. 4), the support program is downloaded to the personal computer 2 by the web server 5. Furthermore, by the initial processing of the download program 2B of the support program, the system data indicating the hardware construction and the software construction of the personal computer 2 are generated and transmitted to the web server 5 together with the device identification data DC1 and the log-in ID and the password input by the user. In the service server 7, the user and the personal computer 2 are authenticated by collating the log-in ID, the password and the system data with the corresponding data recorded and held in the data base by the data base server 4.

When the authentication is rightly performed, the system identification data DC2 for specifying the user and the personal computer 2 are generated, and the system identification data DC2 is transmitted to and recorded in the personal computer 2. The system identification data DC2 is recorded in the data base together with the system data achieved from the personal computer 2. In the program providing system 1, the user and the personal computer 2 can be simultaneously authenticated by using the system identification data DC2 which are held at both the user side and the host side. Therefore, the management of the identification data as described above at the user side can be simplified, so that the cumbersome work at the user side can be effectively avoided and users can use their desired services.

With respect to the device identification data DC1, it is held in the personal computer 2 in such a style that it is difficult to alter the device identification data DC1 dishonestly, and also it is transmitted to the host side at all times. Furthermore, the system identification data DC2 is also transmitted to and held in the personal computer 2 in such a style that it is difficult to dishonestly alter and find the system identification data DC2, whereby any third party can be effectively prevented from unjustly achieving and using the identification data DC2, DC1.

That is, in the program providing system 1, when the download program is started and the download menu or upload menu is operated by the user after a series of user registration processing as described above is carried out, the system identification data DC2 is transmitted to the service server 7, and the service server 7 collates the system identification data DC2 thus transmitted with the system identification DC2 recorded in the data base by the data base server 4 (FIGS. 1 and 5), whereby the authentication of the user and the personal computer 2 is performed by using one identification data DC2 in the program providing system 1.

The system data and the device identification data DC1 are provided to the service server 7 by the personal computer 2 together with the system identification data DC2, and the system data and the device identification data DC1 thus transmitted are collated with the record of the data base by the data base server 4, whereby the authentication processing can be more surely performed. In the series of processing described above, the system data, the system identification data DC2 and the device identification data DC1 are automatically transmitted at all times on the basis of the user's acknowledgement. Therefore, in the program providing system 1, any access from any third party who unjustly achieves these data can be effectively avoided, and further the profit of a copyright holder who created the program concerned can be effectively protected.

still further, at the user side, the authentication processing is notified to the host side and carried out without inputting any keyboard operation by executing the support program having the automatic authentication function based on the system identification data DC2 and the device identification data DC1, thereby enhancing the usability of the system.

In the program providing system 1, when such authentication processing is rightly completed by selection of the download menu, programs contained in the programs such as application programs, drivers, patches, etc. to be provided to the user through the download, which correspond to the personal computer 2 of the user and have not yet been downloaded by the user, are selected on the basis of the system data. When such authentication processing is rightly completed by selection of the update menu, programs contained in the programs such as application programs, drivers, and patches associated with the version-up, the edition-up, etc., which correspond to the personal computer 2 of the user and have not yet been updated by the user, are selected on the basis of the system data.

Furthermore, the programs thus selected are provided to the user in a list style, and downloaded into the personal computer 2 by user's selection.

Accordingly, in the program providing system 1, the user's cumbersome load of downloading such types of programs can be reduced. That is, when an application program is provided separately from a personal computer through the Internet or the like as described above, it is required to check the hardware construction of the computer, the operation program implemented in the computer, etc. and institute a search for the application program at the user side. However, according to the program providing system 1, a program suitable for the personal computer 2 is selected and provided on the basis of the system data at the host side, whereby such a cumbersome work can be effectively avoided and the usability can be enhanced.

In this embodiment, not only the system identification data for specifying the user and the device, but also the device identification data for specifying the device, and the password, the log-in ID and the user ID for specifying the user are recorded, whereby the data base can be applied to various other services. That is, in the service provision using the Internet as described above, there is a service which is dependent on a user, but not dependent on any device like a case where electronic money of an IC card is processed at a terminal device, for example. Conversely, there is also a service which is dependent on a device, but not dependent on any user. That is, the data base according to this embodiment can be broadly used for various services as described above. Accordingly, in the program providing system 1, expandability and flexibility of the system can be secured.

(3) Effect of the Invention

According to the above-described construction, the system identification data for specifying the device and the user of the device is issued to the personal computer serving as a service target device, and the authentication processing is carried out on the basis of the system identification data to provide services, whereby the cumbersome work at the user side can be effectively avoided and user's desired services can be provided to users through the Internet.

In addition to the system identification data, the authentication processing is carried out by using the device identifying data for specifying the device and the system data indicating the construction of the device, whereby the authentication processing can be more surely performed.

With respect to the system identification data and the device identification data, they are held in the personal computer in such a style that it is difficult to dishonestly alter them, so that fraudulent use by a third party can be effectively prevented.

Furthermore, with respect to the system data which is one of the data used for the authentication, it is made more difficult to find the system identification data and the device identification data which are original authentication data by notifying the system data to the host device at all times on the basis of user's prior consent, whereby fraudulent use by a third party can be effectively prevented.

(4) Another Embodiment

In the above-described embodiment, the service suitable for the device is executed on the basis of the system data by selecting and notifying a program suitable for a personal computer on the basis of system data after the authentication processing is carried out on the basis of the system identification data. However, the present invention is not limited to this embodiment, and in place of the processing based on the system data, the service suitable for the personal computer may be executed on the basis of information on a device specified by the system identification data.

Furthermore, in the above-described embodiment, the system data is used for assist authentication or provide programs. However, the present invention is not limited to this embodiment, and a service of restoring the personal computer 2 is provided on the basis of the system data.

Still furthermore, in the above-described embodiment, the password and the log-in ID are provided separately from the personal computer. However, the present invention is not limited to this embodiment, and they may be provided by recording them in the personal computer.

Still furthermore, in the above-described embodiment, the system identification data are created and used on the basis of the password, the log-in ID and the device identification data. However, the present invention is not limited to this embodiment. In short, any manner may be used insofar as the device and the user are specified on the basis of the system identification data, and system identification data which is created irrelevant to the password, the log-in ID and the device identification data may be used.

Still furthermore, in the above-described embodiment, not only the system identification data for specifying the user and the device, but also the device identification data for specifying the device and the password, the log-in ID and the user ID for specifying the user are recorded to construct the data base. However, the present invention is not limited to this embodiment, and the recording of the device identification data, the password, the log-in ID and the user ID may be omitted as occasion demands. This modification suffers deterioration in expandability and flexibility with which the system providing system is applicable to other services, however, it can simplify the system construction more greatly.

In the above-described embodiment, the system identification data is held at the device side behind the curtain. However, the present invention is not limited to this embodiment, and the system identification data may be recorded in an IC card or the like to input it into the device, or identification based on fingerprint collation may be used. Furthermore, when practically sufficient security can be secured, the system identification data may be input by operating a keyboard or the like.

In the above-described embodiment, the present invention is applied to the download service of the program for the personal computer on the Internet. However, the present invention is not limited to this embodiment. For example, the present invention is broadly applicable to such a case that programs are updated for a game machine, a device such as set top box.

Still further, in the above-described embodiment, the support program is achieved by operating the short-cut icon. However, the present invention is not limited to this embodiment, and it may be provided by another method like a case where the support program is provided while it is implemented in a personal computer in advance, a case where it is distributed by CD-ROM or the like.

Still furthermore, in the above-described embodiment, the data achieved by the support program are directly transmitted to the web server. However, the data achieved may be held as DB in a personal computer to provide other services using these data.

Still furthermore, in the above-described embodiment, in the program providing system for the download service of programs, the present invention is applied to the service providing apparatus constructed by the web server, etc. However, the present invention is not limited to this embodiment, and the present invention is broadly applicable to a service providing apparatus which provides various kinds of services such as distribution of various kinds of contents.

Still furthermore, in the above-described embodiment, the present invention is applied to the download service of programs for personal computers on the Internet. However, the present invention is not limited to this embodiment, and the present invention is broadly applicable to a case where music, video or other types of data are distributed.

Still furthermore, in the above-described embodiment, the present invention is applied to the service on the Internet. However, the present invention is not limited to this embodiment, and it may be broadly applied to a case where services are provided on various networks.

As described above, according to the present invention, the system identification data for specifying a service target device and the user of the device concerned are issued to the device concerned, and the authentication processing is carried out on the basis of the system identification data to provide services, whereby the cumbersome work at the user side can be effectively avoided and a user's desired service and an optimum service can be provided through the Internet or the like.

What is claimed is:

1. A service providing apparatus for providing a service to any of a plurality of service target devices, each associated with a same user, via data communications, the service providing apparatus comprising at least one computer programmed to:

generate, upon provision of user information and device identification data identifying a first service target device of the plurality of service target devices, system identification data for specifying the first service target device and the user, the generation of the system identification data being performed via processing making it impossible to determine the system identification data from the user information;

issue, to the first service target device, the system identification data through data communications with the first service target device;

receive a request, from the first service target device, to provide a download program to the first service target device, the request specifying system data, the system identification data and the device identification data, the system data comprising information relating to a hardware construction of the first service target device and information relating to a software configuration of the first service target device;

authenticate the user, using the system identification data;

authenticate the first service target device, by confirming a correlation between the system identification data and the device identification data;

determine whether to provide the download program to the first service target device based on data specified in the request, and not based on any information provided by the user;

if it is determined that the download program is to be provided, identify which of a plurality of versions of the download program is to be provided to the first service target device based at least in part on the system data specified in the request; and charge the user upon the download program being downloaded to the first service target device.

2. A service providing method through which at least one web server provides a service to any of a plurality of service target devices, each associated with a same user, via data communications, the service providing method comprising:

an identification data generation step for generating, upon provision of user information and device identification data identifying a first service target device of the plurality of service target devices, system identification data for specifying the first service target device and the user, wherein the generation of the system identification data is performed via processing making it impossible to determine the system identification data from the user information;

an identification data issuing step for issuing, by the at least one web server to the first service target device, the system identification data through data communications with the first service target device;

a request receipt step for receiving, from the first service target device, a request to provide a download program to the first service target device, the request specifying system data, the system identification data and the device identification data, the system data comprising information relating to a hardware construction of the first service target device and information relating to a software configuration of the first service target device;

a user authentication step for authenticating the user, using the system identification data;

a device authentication step for authenticating the first service target device, by confirming a correlation between the system identification data and the device identification data;

a determination step for determining whether to provide the download program to the first service target device based on data specified in the request, and not based on any information provided by the user;

an identification step for identifying, if it is determined in the determination step that the download program is to be provided, which of a plurality of versions of the download program is to be provided to the first service target device based at least in part on the system data specified in the request; and a settlement data storing step for storing settlement data usable to charge the user upon the download program being downloaded to the first service target device.

3. The service providing method as claimed in claim 2, wherein said identification data issuing step issues the system identification data on a basis of device identification data for identifying the first service target device uniquely and user identification data for specifying the user.

4. The service providing method as claimed in claim 2, wherein said identification data issuing step acquires system data indicating a structure of the first device, and said service providing step for retrieving a download program usable in the first service target device refers to the system data to provide a service to the first device.

5. The service providing method as claimed in claim 2, wherein said service providing step for retrieving a download program usable in the first service target device comprises acquiring system data indicating a structure of the first service target device from the first service target device in response to a service request from the first service target device, and refers to the system data thus acquired to provide a service to the first service target device.

6. The service providing method as claimed in claim 2, wherein the service provided by said service providing step is a program downloading service.

7. A service providing apparatus for providing a service to a plurality of devices, each associated with a same user, via communication over a network, the service providing apparatus comprising at least one computer programmed to:

generate, upon provision of user information and device identification data identifying a first device of the plurality of devices, system identification data for specifying the first device and the user, the generation of the system identification data is performed via processing making it impossible to determine the system identification data from the user information;

issue, via the network, the system identification data to the first device;

receive a request, from the first device, to provide a service to the first device, the request specifying the system identification data and the device identification data;

authenticate the user, using the system identification data;

authenticate the first device, by confirming a correlation between the system identification data and the device identification data;

determine whether to provide the service to the first device based on data specified in the request, and not based on any information provided by the user;

if it is determined that the service is to be provided, identifying which of a plurality of versions of the service is to be provided to the first device based at least in part on data specified in the request; and store settlement data usable to charge the user upon the version of the service being provided to the first device.

8. A service providing apparatus for providing a service to a plurality of devices, each associated with a same user, via communication over a network, the service providing apparatus comprising at least one computer programmed to:

generate, upon provision of user information and device identification data identifying a first device of the plurality of devices, system identification data for specifying the first device and the user, the generation of the system identification data being performed via processing making it impossible to determine the system identification data from the user information;

issue, via the network, the system identification data to the first device;

receive a request, from the first device, to provide a download service to the first device, the request specifying system data, the system identification data and the device identification data, the system data indicating a system structure of the first device;

authenticate the user, using the system identification data;

authenticate the first device, by confirming a correlation between the system identification data and the device identification data;

determine whether to provide the download service to the first device based on the system data specified in the request, and not based on any information provided by the user;

if it is determined that the download service is to be provided, identifying which of a plurality of versions of the service is to be provided to the first device based at least in part on the system data; and store settlement data usable to charge the user upon the version of the download service being provided to the first device.

9. The service providing apparatus as claimed in claim 8, wherein said determining comprises referring to the system data to provide an updatable application.

* * * * *